US011860807B1

(12) United States Patent
Lee et al.

(10) Patent No.: US 11,860,807 B1
(45) Date of Patent: Jan. 2, 2024

(54) USB DATA COMMUNICATION METHOD AND DEVICE BASED ON HYBRID USB NETWORK

(71) Applicant: Winstars Technology Ltd, Guangdong (CN)

(72) Inventors: Chun Lee, Guangdong (CN); Wei Nie, Guangdong (CN)

(73) Assignee: Winstars Technology Ltd, Guangdong (CN)

(*) Notice: Subject to any disclaimer, the term of this patent is extended or adjusted under 35 U.S.C. 154(b) by 0 days.

(21) Appl. No.: 18/202,366

(22) Filed: May 26, 2023

(30) Foreign Application Priority Data

Jun. 16, 2022 (CN) .......................... 202210679304.X

(51) Int. Cl.
*G06F 13/38* (2006.01)
*G06F 13/42* (2006.01)

(52) U.S. Cl.
CPC ........ *G06F 13/385* (2013.01); *G06F 13/4282* (2013.01); *G06F 2213/0042* (2013.01)

(58) Field of Classification Search
CPC ...................................................... G06F 3/167
See application file for complete search history.

(56) References Cited

U.S. PATENT DOCUMENTS

| 2015/0039788 A1* | 2/2015 | Dearing | G06F 13/20 |
| | | | 710/18 |
| 2021/0157759 A1* | 5/2021 | Lin | G06F 13/4027 |
| 2022/0327088 A1* | 10/2022 | Nahvi | G06F 13/28 |

\* cited by examiner

*Primary Examiner* — Henry Tsai
*Assistant Examiner* — Juanito C Borromeo
(74) *Attorney, Agent, or Firm* — COOPER LEGAL GROUP LLC

(57) ABSTRACT

Disclosed are a USB data communication method and device based on a hybrid USB Network. The USB data communication method based on a hybrid USB Network includes following steps executed by the docking station terminal: obtaining a USB data monitoring command carrying an operation mode; when the operation mode is an automatic mode, monitoring a data communication status of a USB input and output interface; when the data communication status is a no input and output information status, monitoring a data of a network input data interface of a network module in the docking station terminal; when the network input data interface obtains a data sending request sent by a client terminal via the hybrid USB Network, in which the data sending request includes network data and a target transmission device, converting the network data into a USB communication data via a soft switching module in the docking station terminal.

5 Claims, 9 Drawing Sheets

S211 — when the operation mode is a USB mode, the docking station terminal continuously monitors the data of the USB input and output interface S212 — when the operation mode is a network mode, the docking station terminal continuously monitors the data of the network input data interface of the network module in the docking station terminal

USB DATA COMMUNICATION METHOD AND DEVICE BASED ON HYBRID USB NETWORK

CROSS-REFERENCE TO RELATED APPLICATION

The present application claims the priority benefit of China application No. 202210679304.X, filed on Jun. 16, 2022. The entirety of China application No. 202210679304.X is incorporated herein by reference and made a part of this specification.

TECHNICAL FIELD

The present application relates to the technical field of communication hardware, and in particular, to a USB data communication method and device based on a hybrid USB Network which support USB Cable mode and Network mode.

BACKGROUND

A USB docking station is an adapter that can expand the limited interfaces of a laptop into to various types of interfaces, such a USB, HDMI video interface, memory card interface, etc., which can satisfy multiple requirements of usage for a slim laptop. The docking station is configured to externally connect to a display/projector for displaying, an external device such as a USB drive, a network cable and a supply power (for supplying power to computer and parts of external devices). The output interfaces of a USB docking station are divided into four categories, in which a video interface and a file transmission interface are the most important, including: 1. video interface: Type-C, DP, HDMI, DVI, VGA and so on; 2. file transmission interface: Type-C (USB protocol/lightning protocol), Type-A, SD/TF card slot and so on; 3. network interface: RJ45 wired network card interface; 4. power source interface: PD fast charging/common power supply (mostly contained in Type-C interface) and so on. Without exception, in any way mentioned above, a data line is necessary for a data interaction. A great number of data lines would cause signal interference, and the data interaction is limited by the transmission length of data lines.

SUMMARY

The embodiment of present application provides a USB data communication method and device based on a hybrid USB Network, in order to solve the above problem, i.e., a data line being necessary for a data interaction, a great number of data lines causing signal interference, and the data interaction being limited by the transmission length of data lines.

A USB data communication method based on a hybrid USB Network, comprising following steps executed by a docking station terminal:
  obtaining a USB data monitoring command carrying an operation mode;
  when the operation mode is an automatic mode, monitoring a data communication status of a USB input and output interface;
  when the data communication status is a no input and output information status, monitoring data of a network input data interface of a network module in the docking station terminal;
  when the network input data interface obtains a data sending request sent by a client terminal via the hybrid USB Network, wherein the data sending request includes network data and a target transmission device, converting the network data into a USB communication data via a soft switching module in the docking station terminal; and
  sending, via a USB output data interface, the USB communication data to the target transmission device.

In some embodiments, after obtaining a USB data monitoring command carrying an operation mode, the method further comprise:
  when the operation mode is a USB mode, continuously monitoring the data of the USB input and output interface; and
  when the operation mode is a network mode, continuously monitoring the data of the network input data interface of the network module in the docking station terminal.

In some embodiments, after monitoring a data communication status of a USB input and output interface, the method further comprises:
  when the data communication status is a status of presence of input and output information, continuously monitoring the data of the USB input and output interface.

A USB data communication method based on a hybrid USB Network, comprising following steps executed by a client terminal:
  sending a docking station terminal finding request to the hybrid USB Network via a network module in the client terminal;
  when there is any docking station terminal on the hybrid USB Network, connecting to the docking station to form a communication channel between the client terminal and the docking station terminal;
  sending a data sending request to the docking station terminal via the hybrid USB Network, wherein the data sending request comprises a network data and a target transmission device; and
  when the communication channel is in a sharing mode, sending the network data to the target transmission device via the docking station terminal on the hybrid USB Network.

In some embodiments, after forming the communication channel between the client terminal and the docking station terminal, the method further comprises:
  when the communication channel is in a personal mode and the client terminal is not a first connection terminal, waiting for the docking station terminal to send a communicable command;
  when receiving a communicable command sent by the docking station terminal, sending the network data to the target transmission device via the docking station on the hybrid USB Network.

A USB data communication device based on a hybrid USB Network, comprising: a docking station terminal and a client terminal, wherein the docking station terminal comprises:
  a monitoring command obtaining unit, configured to obtain a USB data monitoring command carrying an operation mode;
  a communication status monitoring unit, configured to monitor a data communication status of a USB input and output interface when the operation mode is an automatic mode;

a data monitoring unit, configured to monitor a data of a network input data interface of a network module in the docking station terminal when the data communication status is a no input and output information status;

a network data conversion unit, configured to, when the network input data interface obtains a data sending request sent by a client terminal via the hybrid USB Network, wherein the data sending request includes network data and a target transmission device, convert the network data into USB communication data via a soft switching module in the docking station terminal;

a USB communication data sending unit, configured to send, via a USB output data interface, the USB communication data to the target transmission device: and wherein the client terminal comprises:

a docking station terminal finding request unit, configured to send a docking station terminal finding request to the hybrid USB Network via a network module in the client terminal;

a communication channel forming unit, configured to connect to the docking station, to form a communication channel between the client terminal and the docking station terminal, when there is any docking station terminal on the hybrid USB Network;

a data sending request sending unit, configured to send a data sending request to the docking station terminal via the hybrid USB Network, wherein the data sending request comprises network data and a target transmission device;

a network data sending unit, configured to send the network data to the target transmission device via the docking station terminal on the hybrid USB Network when the communication channel is in a sharing mode.

In some embodiments. a software module in the docking station terminal comprises:

a USB device management tree, a USB device manager, a terminal connector, and a client terminal connecting manager.

In some embodiments, the network module in the client terminal comprises:

a USB network transfer protocol module, a connecting manager module, a device manager module and a virtual USB device manager module.

The above USB data communication method and device based on a hybrid USB Network, enables the docking station terminal and the client terminal to control various connected USB device via hybrid USB Network, in which the hybrid USB Network includes wireless network and wired Ethernet, the limitation of data transmission only by USB cable can be removed, by expanding the data transmission form of docking station terminal to Ethernet data and wireless data, so that the data transmission will not be limited by USB cable, the space of data transmission is expanded and the speed of data transmission is accelerated; the docking station terminal can be automatically switched to network mode via the automatic mode of the docking station terminal, which improves the flexibility of the USB data communication method based on a hybrid USB Network; via the sharing mode in the client terminal, no matter whether the target transmission device on the hybrid USB Network is in an occupied state, it can realized that the target transmission device can be simultaneously occupied, which improves the usage efficiency of the target transmission device and usage convenience of individual client terminals under the sharing network mode.

BRIEF DESCRIPTION OF THE DRAWINGS

To illustrate the technical solution according to an embodiment of the present application more clearly, drawings needed to be used in the description of embodiment in present application will be simply described, obviously, the drawings in following description is only some embodiment of present application, for those who are skilled in the art, without paying creative labor, other drawings can be obtained from these drawings.

DESCRIPTION OF THE EMBODIMENTS

The technical solution will be described clearly and completely, in the following in combination with drawings according to an embodiment of the present application. Obviously, the described embodiment is a part of embodiment of present application, not all of the embodiments. Based on embodiment in present application, all of the other embodiments obtained by those who are skilled in the art without creative works, falls into the protection scope of present application.

Figure 1:
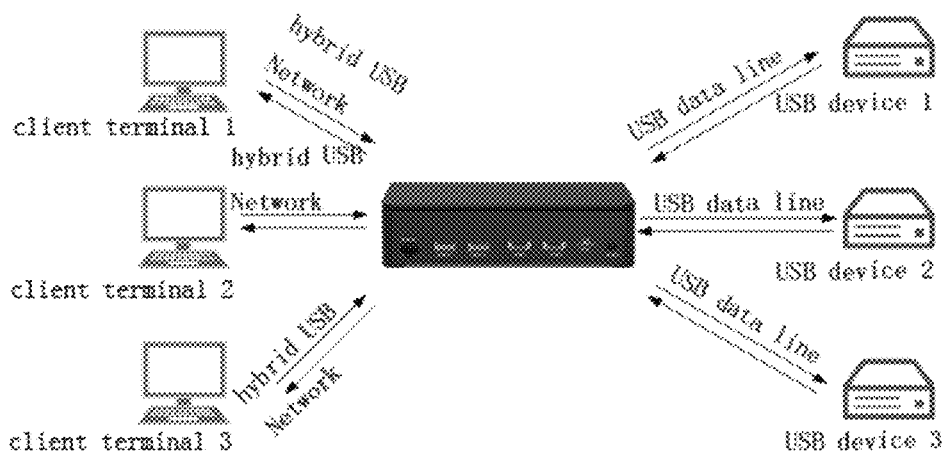
FIG. 1 illustrates a schematic diagram of an application environment for the USB data communication method based on a hybrid USB Network according to an embodiment of the present application.
Figure 2:
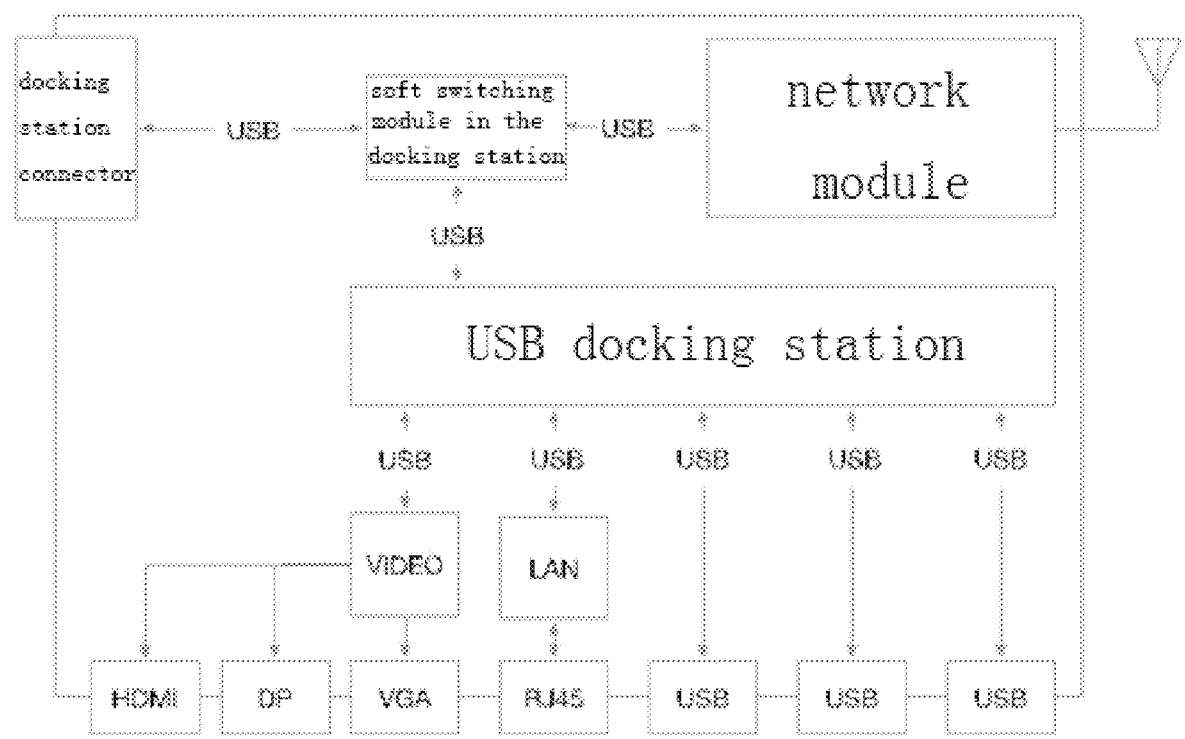
FIG. 2 illustrates a structure schematic diagram of a docking station terminal in a USB data communication method based on a hybrid USB Network according to an embodiment of the present application.

The USB data communication method based on a hybrid USB Network according to the present application may be applied in an application environment as shown in FIG. 1. The USB data communication method based on a hybrid USB Network may be applied in a USB data communication device based on a hybrid USB Network. The USB data communication device based on a hybrid USB Network includes a docking station terminal and a client terminal. In particularly, the docking station terminal communicates with the client terminal via the hybrid USB Network, and the client terminal is a program configured to provide a local service for the client. As illustrated in FIG. 2, the docking station terminal includes a USB docking station, a network module and a soft switching module. The USB docking station is a traditional USB docking module. The network module in the docking station terminal is configured for transmission of USB communication data via a network. The client terminal may select a USB docking function provided by the USB docking module or a network USB function provided by the network module in the docking station module according to a requirement.

The USB data communication method based on a hybrid USB Network includes the following steps executed by a docking station terminal:

obtaining a USB data monitoring command carrying an operation mode;

when the operation mode is an automatic mode, monitoring a data communication status of a USB input and output interface, particularly, the USB input and output interface is an upstream interface;

when the data communication status is a no input and output information, monitoring data of a network input data interface of a network module in the docking station terminal, particularly, the network module in the docking station includes a wireless chipset and Ethernet chipset;

when the network input data interface obtains a data sending request sent by a client terminal via the hybrid USB Network, in which the data sending request includes network data and a target transmission device, converting the network data into a USB communication data via a soft switching module in the docking station terminal, which means converting the network communication data and USB communication data to each other via a docking station terminal software converting module; and sending, via a USB output data interface, the USB communication data to the target transmission device.

Figure 3:
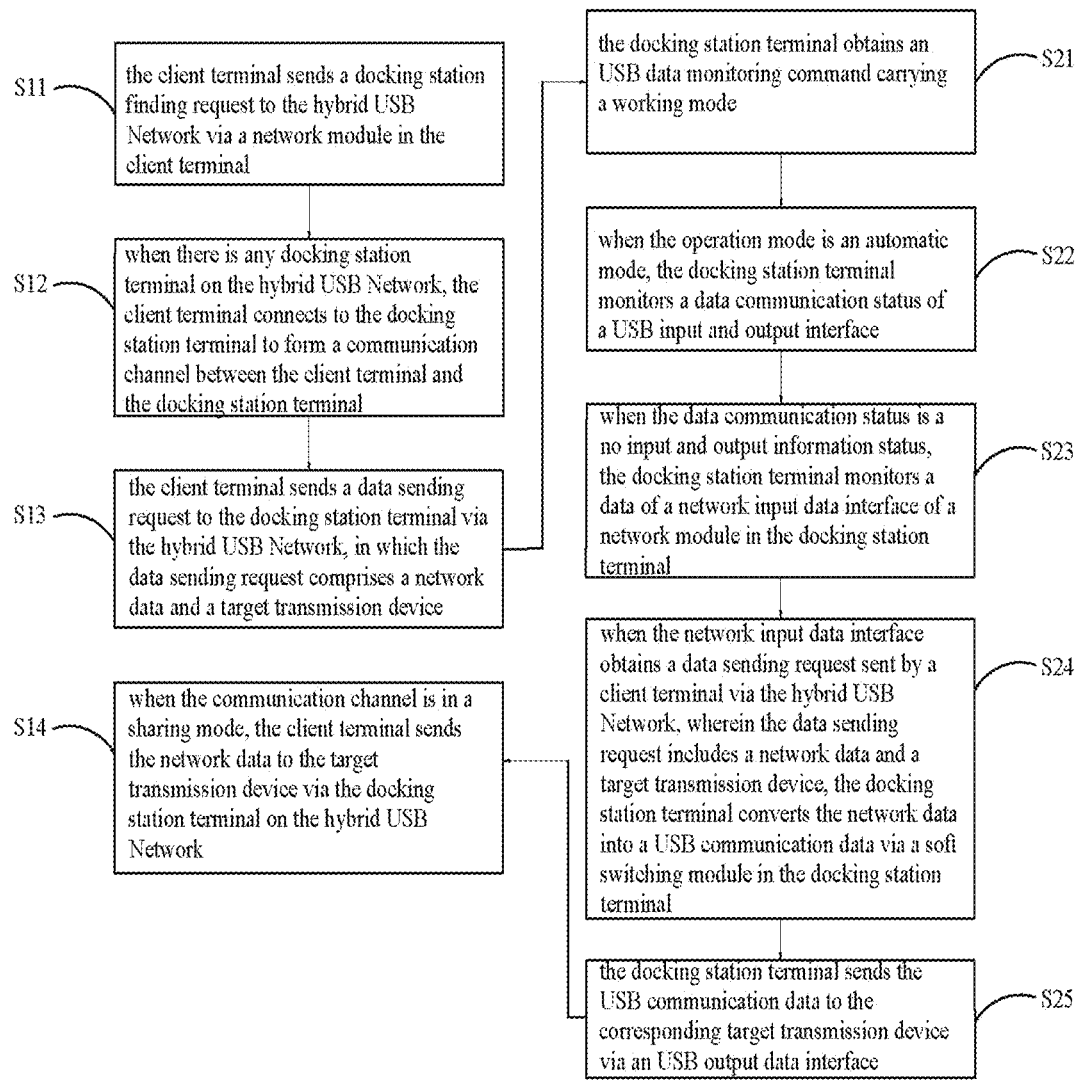
FIG. 3 illustrates a flow chart of the USB data communication method based on a hybrid USB Network according to an embodiment of the present application.

The USB data communication method based on a hybrid USB Network includes the following steps executed by a client terminal:

sending a docking station terminal finding request to the hybrid USB Network via a network module in the client terminal;

when there is any docking station terminal on the hybrid USB Network, connecting to the docking station to form a communication channel between the client terminal and the docking station terminal;

sending a data sending request to the docking station terminal via the hybrid USB Network, in which the data sending request comprises a network data and a target transmission device;

if the communication channel is in a sharing mode, sending the network data to the target transmission device via the docking station on the hybrid USB Network;

In an embodiment, as illustrated in FIG. 3, a USB data communication method based on a hybrid USB Network is provided. In an example, the method, which is applied in a client terminal and a docking station terminal of a USB data communication device based on a hybrid USB Network in FIG. 1, particularly includes the following steps:

S11: the client terminal sends a docking station terminal finding request to the hybrid USB Network via a network module in the client terminal.

In particular, the client terminal is a terminal configured to connect to the (USB) docking station via the hybrid USB Network (including a wired Ethernet and a wireless WIFI network, etc.) and control the device (e.g., target transmission devices such as projector and printer) connected to the docking station terminal via a USB cable.

Particularly, docking station terminal finding request is a request that the client terminal finds that whether an available docking station terminal exists in the current hybrid USB Network.

S12: when there is any docking station terminal on the hybrid USB Network, the client terminal connects to the docking station terminal to form a communication channel between the client terminal and the docking station terminal.

Particularly, the docking station terminal and the client terminal can establish a communication channel therebetween with a handshake protocol etc., which may include an Ethernet and a wireless network, for transmitting network data.

S13: the client terminal sends a data sending request to the docking station terminal via the hybrid USB Network, in which the data sending request comprises a network data and a target transmission device.

S21: the docking station terminal obtains a USB data monitoring command carrying an operation mode.

In particular, in the present embodiment, the operation mode can be set to an automatic mode and a manual mode. The automatic mode can automatically determine whether the docking station terminal currently adapts a USB mode or a network mode. It can be understood that, in the manual mode, the current operation mode is manually set as the USB mode or the network mode.

The USB data monitoring command is a request for obtaining USB communication data via an input or output data interface in docking station terminal.

S22: when the operation mode is an automatic mode, the docking station terminal monitors a data communication status of a USB input and output interface.

Particularly, when the operation mode of the docking station terminal is the automatic mode, the docking station terminal determines whether the current operation mode is the USB mode or the network mode in the automatic mode.

It can be understood that, when there is a USB cable in the USB input and output interface of the docking station terminal, and the USB input and output interface is in a status of presence of input or output data, the docking station terminal determines that the current operation mode is the USB mode in the automatic mode; otherwise, determines that the current operation mode is the network mode.

S23: when the data communication status is a no input and output information status, the docking station terminal monitors data of a network input data interface of a network module in the docking station terminal.

Figure 4:
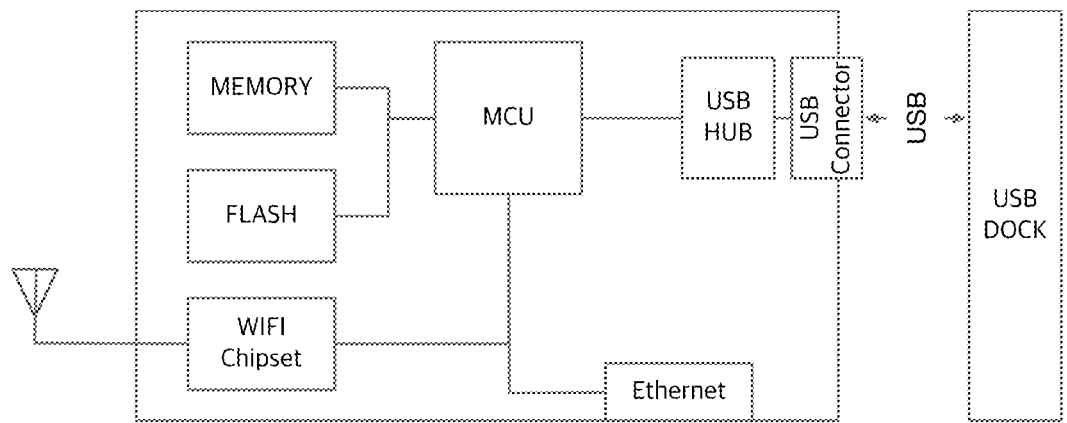
FIG. 4 illustrates a structure schematic diagram of a network module of a docking station terminal in the USB data communication method based on a hybrid USB Network according to an embodiment of the present application.

In particular, the network module in the docking station terminal illustrated in FIG. 4 includes a USB hub, a MCU component configured to convert the USB communication data into the network data, as well as a wireless chipset and Ethernet chipset configured for network processing.

Particularly, when the data communication status is a no input and output information status, the docking station terminal automatically monitors data of the network input data interface of the network module in the docking station terminal, to adjust the current operation mode to the network module in the automatic mode.

S24: when the network input data interface obtains a data sending request sent by a client terminal via the hybrid USB Network, wherein the data sending request includes a network data and a target transmission device, the docking station terminal converts the network data into a USB communication data via a soft switching module in the docking station terminal.

In particular, the network data is command data sent to the USB device terminal by the client terminal via the hybrid USB Network.

The soft switching module in the docking station is configured to convert network data into USB communication data with the soft handoff, and send, via the USB docking station terminal, the converted USB communication data to a target transmission device that can identify the data.

S25: the docking station terminal sends the USB communication data to the target transmission device via a USB output data interface.

Particularly, the target transmission device, such as a printer or a screen, receives the USB communication data from the client terminal, and prints or displays the same.

S14: when the communication channel is in a sharing mode, the client terminal sends the network data to the target transmission device via the docking station terminal on the hybrid USB Network.

In particular, the sharing mode refers to a mode that a plurality of client terminals can share a plurality of USB devices (target transmission device) via the docking station terminal.

Figure 5:
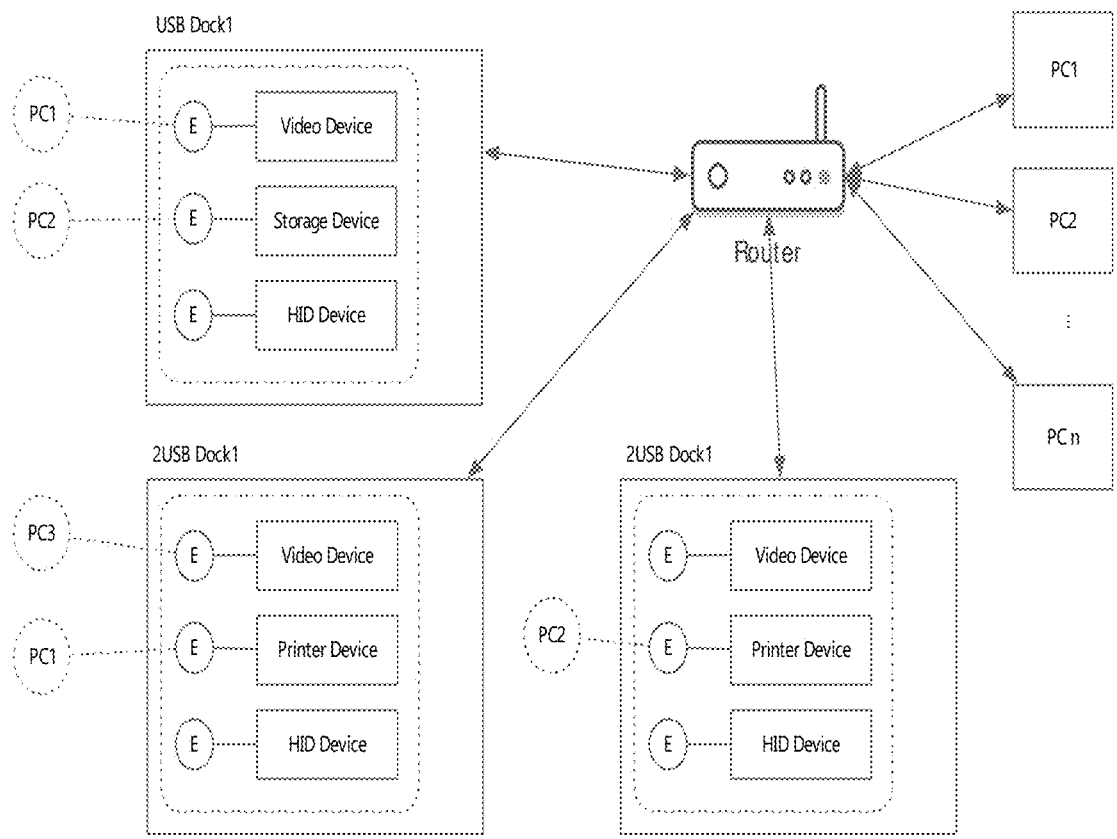
FIG. 5 is a schematic diagram illustrating occupancy of a target transmission device by a client terminal in the USB data communication method based on a hybrid USB Network according to an embodiment of the present application.

Particularly, when the hybrid USB Network mode is adapted, as illustrated in FIG. 5, a plurality of docking stations may exist in a network, and devices of each docking station may be accessed and used by a plurality of client terminals at the same time. In the present embodiment, a plurality of client terminals, a plurality of docking station terminals as well as a plurality of USB devices connected to each docking station terminal, all of which belong to the same network, can transmit network communication data or USB communication data with each other under deployment by a network device (e.g., a router). In the method according to the present embodiment, the current target transmission device can be used by a client terminal that currently uses the current target transmission device and another client terminal simultaneously, without waiting for the release by the former client terminal.

In the USB data communication method based on a hybrid USB Network according to the present embodiment, the docking station terminal and the client terminal may control the connected USB devices via a hybrid USB Network that includes a wireless network and a wired Ethernet, which can eliminate the limitation that data is transmitted only by means of a USB cable. By expanding the data transmission via a docking station terminal to Ethernet data and wireless data, so that the data transmission will not be limited by a USB cable, the space of data transmission is expanded and the speed of data transmission is accelerated. The docking station terminal can be automatically switched to a network mode by means of the automatic mode of the docking station terminal, which improves the flexibility of the USB data communication method based on a hybrid USB Network. With the sharing mode in the client terminal, no matter whether the target transmission device on the hybrid USB Network is in an occupied state, the target transmission device can be simultaneously occupied, which improves the usage efficiency of the target transmission device and usage convenience of individual client terminals under the sharing network mode.

Figure 6:
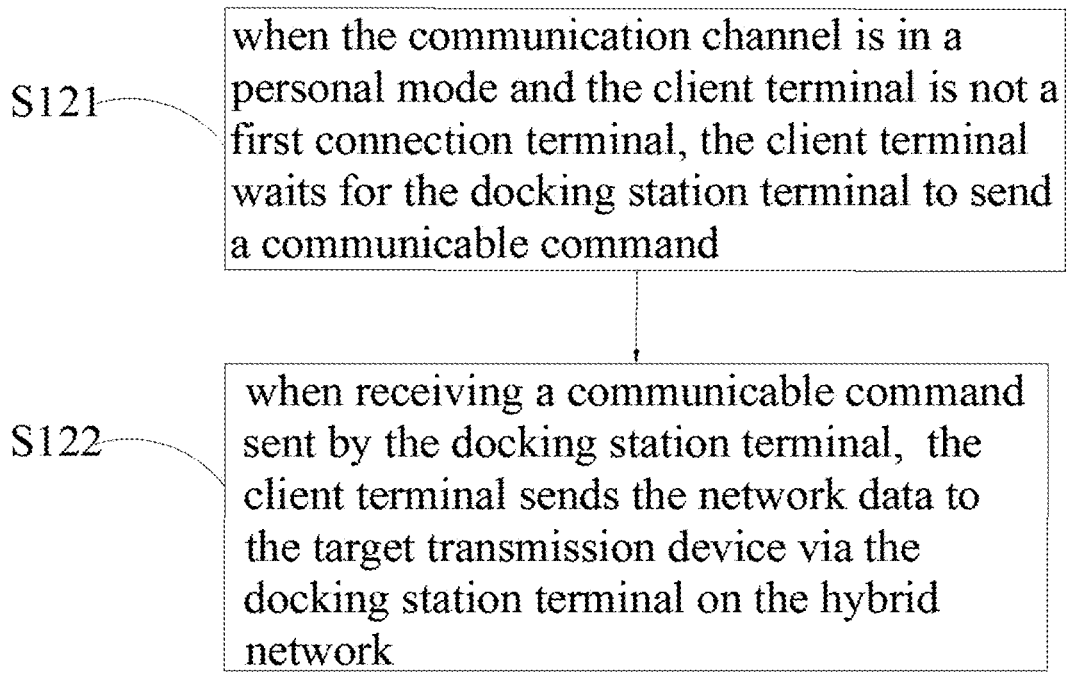
FIG. 6 illustrates a first flow chart of the USB data communication method based on a hybrid USB Network according to an embodiment of the present application.
Figure 7:
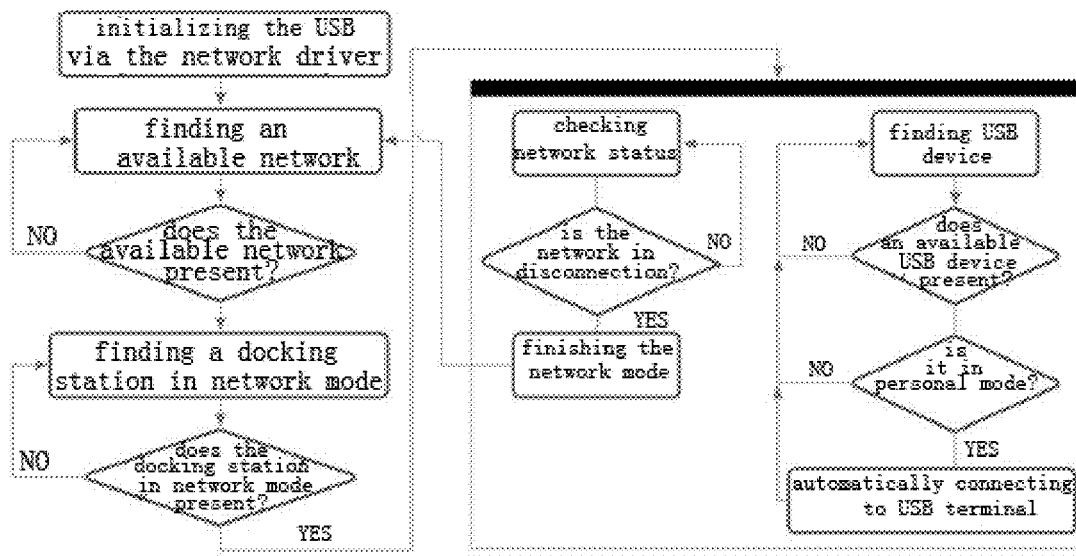
FIG. 7 illustrates a flow chart of connecting of a client terminal to a target transmission device in the USB data communication method based on a hybrid USB Network according to an embodiment of the present application.

In a particular embodiment, as illustrated in FIGS. 6 and 7, after the step S12, i.e., after forming a communication channel between the client terminal and the docking station terminal, the method particularly includes the following steps:

S121: when the communication channel is in a personal mode and the client terminal is not a first connection terminal, the client terminal waits for the docking station terminal to send a communicable command; and S122: when receiving a communicable command sent by the docking station terminal, the client terminal sends the network data to the target transmission device via the docking station terminal on the hybrid USB Network.

In particular, the personal mode refers to a mode in which a client terminal (a first connection terminal) that first connects to the docking station terminal occupies all of the USB devices. The other clients can only use the released USB device when the network connection of the currently connected client terminal is terminated.

Figures 8, 9:
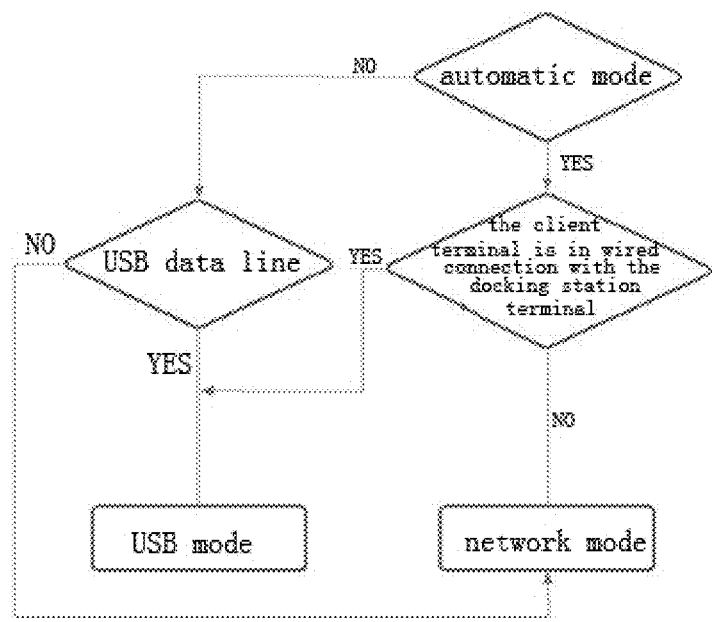
FIG. 8 illustrates a second flow chart of the USB data communication method based on a hybrid USB Network according to an embodiment of the present application.
FIG. 9 illustrates a schematic diagram of a connection process between a docking station and the hybrid USB Network in the USB data communication method based on a hybrid USB Network according to an embodiment of the present application.

In a particular embodiment, as illustrated in FIGS. 8 and 9, after the step S21, i.e., after obtaining a USB data monitoring command carrying an operation mode, the method further particularly includes the following steps:

S211: when the operation mode is a USB mode, the docking station terminal continuously monitors the data of the USB input and output interface; and S212: when the operation mode is a network mode, the docking station terminal continuously monitors the data of the network input data interface of the network module in the docking station terminal.

Particularly, the USB data communication method based on a hybrid USB Network according to the present embodiment further includes a manual mode, in which the docking station terminal can be manually set to the USB mode or the network mode. The setting can be achieved with a physical switch and so on. In some embodiments, if the network mode is set in the manual mode, and when a USB cable is connected, the connected device can be charged via the docking station and the USB cable.

In a particular embodiment, after the step S22, i.e., after monitoring a data communication status of a USB input and output interface, the method further particularly includes the following step:

when the data communication status is a status of presence of input and output information, the docking station terminal continuously monitors the data of the USB input and output interface.

Particularly, if the data communication status is presence of input and output information, it indicates that there is data transmission between a client terminal and a USB device via the USB cable currently. Therefore, the mode of transmitting data via the USB cable under the automatic mode should be maintained.

In the USB data communication method based on a hybrid USB Network according to the present embodiment, the docking station terminal and the client terminal may control the connected USB devices via a hybrid USB Network that includes a wireless network and a wired Ethernet, which can eliminate the limitation that data is transmitted only by means of a USB cable. By expanding the data transmission via a docking station terminal to Ethernet data and wireless data, so that the data transmission will not be limited by a USB cable, the space of data transmission is expanded and the speed of data transmission is accelerated. The docking station terminal can be automatically switched to a network mode by means of the automatic mode of the docking station terminal, which improves the flexibility of the USB data communication method based on a hybrid USB Network. With the sharing mode in the client terminal, no matter whether the target transmission device on the hybrid USB Network is in an occupied state, the target transmission device can be simultaneously occupied, which improves the usage efficiency of the target transmission device and usage convenience of individual client terminals under the sharing network mode.

Figure 10:
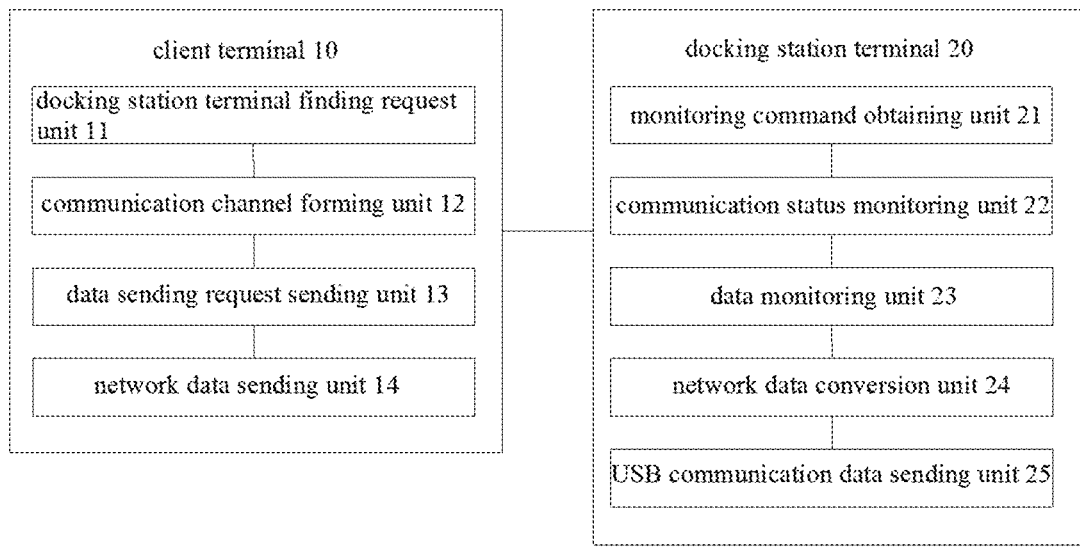
FIG. 10 illustrates a schematic diagram of a USB data communication device based on a hybrid USB Network according to an embodiment of the present application.

In an embodiment, a USB data communication device based on a hybrid USB Network is provided. The USB data communication device based on a hybrid USB Network corresponds to the USB data communication method based on a hybrid USB Network in above embodiments. As illustrated in FIG. 10, the USB data communication device based on a hybrid USB Network includes a client terminal 10 and a docking station terminal 20. In particular, function modules in the client terminal are described in detail below:

a docking station terminal finding request unit 11, configured to send a docking station terminal finding request to the hybrid USB Network via a network module in the client terminal;

a communication channel forming unit 12, configured to connect to the docking station, and form a communication channel between the client terminal and the docking station terminal, when there is any docking station terminal on the hybrid USB Network;

a data sending request sending unit 13, configured to send a data sending request to the docking station terminal via the hybrid USB Network, in which the data sending request comprises a network data and a target transmission device; and a network data sending unit 14, configured to send the network data to the target transmission device via the docking station terminal on the hybrid USB Network when the communication channel is in a sharing mode.

Figure 11:
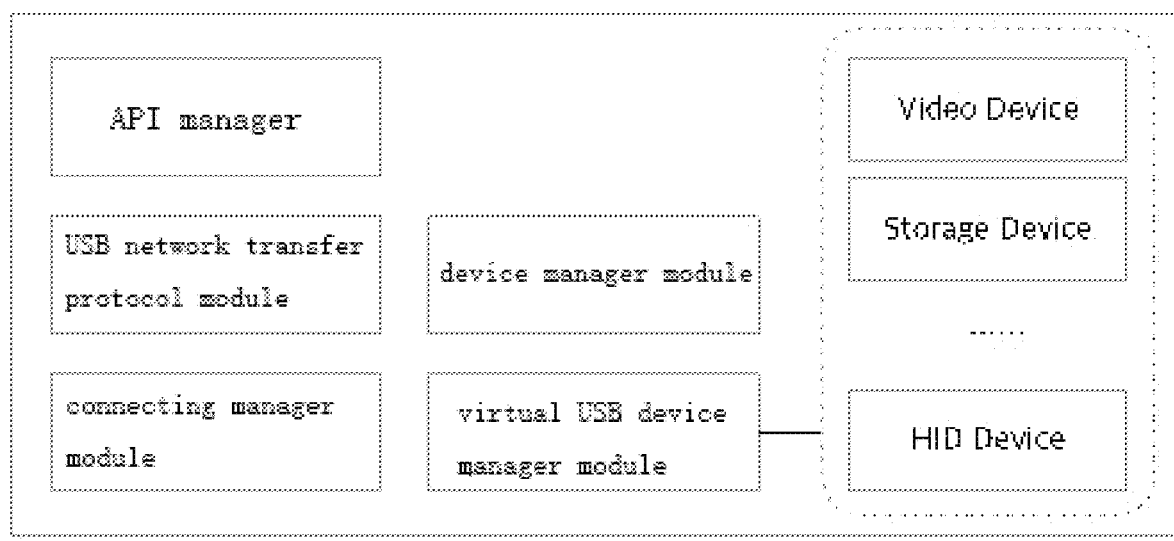
FIG. 11 illustrates a structure schematic diagram of a network module of a client terminal in the USB data communication device based on a hybrid USB Network according to an embodiment of the present application.

Optionally, the network module in the client terminal, as illustrated in FIG. 11, includes: a USB network transfer protocol module, a connecting manager module, a device manager module, and a virtual USB Device manager module.

In particular, the connecting manger module, as illustrated in FIG. 7, is configured to try to search for a USB docking station terminal on the hybrid USB Network; try to connect to the USB docking station terminal if the USB docking station is found; and find a connectable USB device on the docking station terminal.

The USB network transfer protocol module is configured to convert the USB communication data of an actual USB device provided from the docking station terminal, and communicate with a USB device manager connected to a PC in the network.

The device manager module and the virtual USB Device manager module enables a USB device identified on the network to be identified as a device connected to a real client terminal, and allow drive program of the actual USB device to be loaded and operate on the operation system.

In an embodiment, a USB data communication device based on a hybrid USB Network is provided. The USB data communication device based on a hybrid USB Network corresponds to the USB data communication method based on a hybrid USB Network mentioned in the above embodiments. The USB data communication device based on a hybrid USB Network includes a docking station terminal. Function modules in the docking station terminal are described in detail below:

a monitoring command obtaining unit 21, configured to obtain a USB data monitoring command carrying an operation mode;

a communication status monitoring unit 22, configured to monitor a data communication status of a USB input and output interface when the operation mode is an automatic mode;

a data monitoring unit 23, configured to monitor a data of a network input data interface of a network module in the docking station terminal when the data communication status is a no input and output information status;

a network data conversion unit 24, configured to, when the network input data interface obtains a data sending request sent by a client terminal via the hybrid USB Network, wherein the data sending request includes a network data and a target transmission device, convert the network data into a USB communication data via a soft switching module in the docking station; and a USB communication data sending unit 25, configured to send, via a USB output data interface, the USB communication data to the target transmission device.

Figure 12:
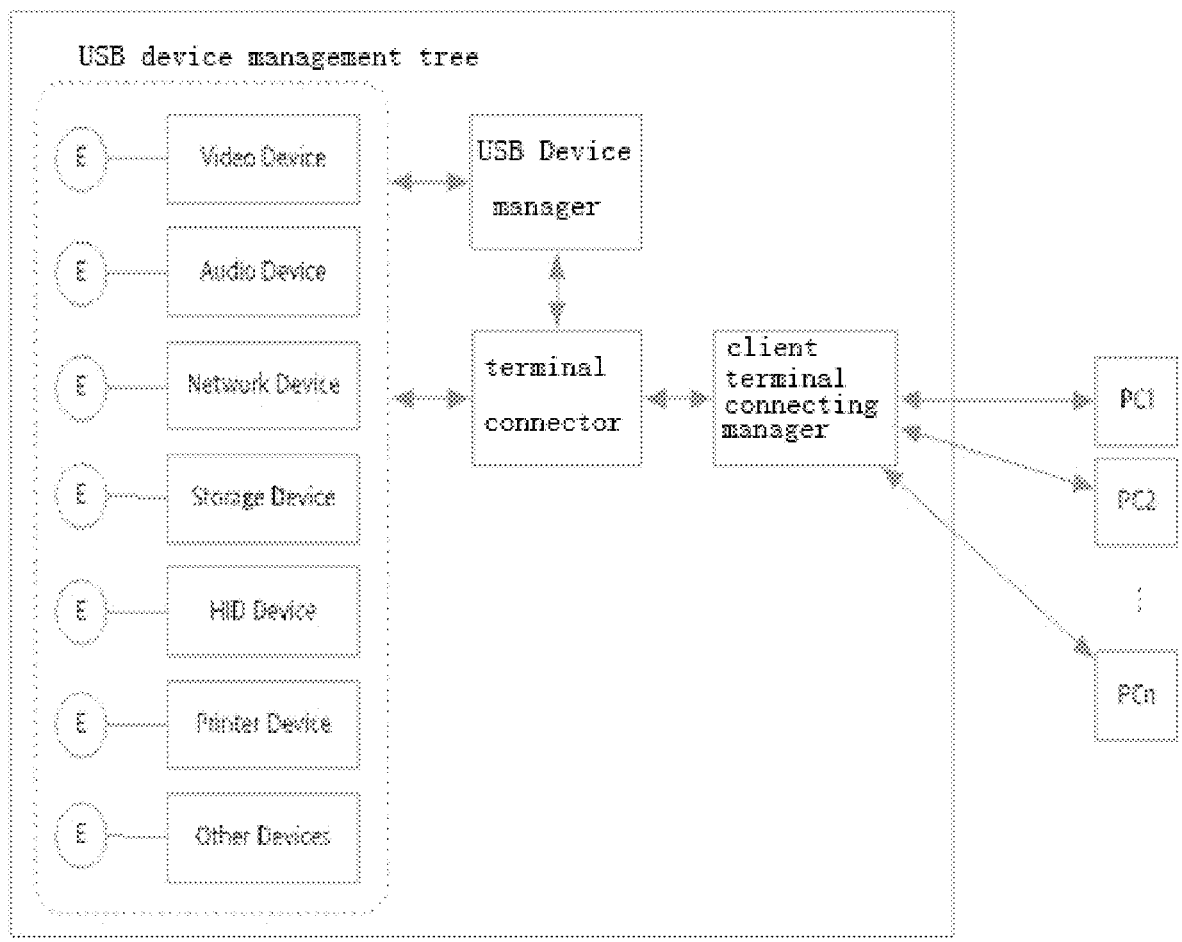
FIG. 12 illustrates a structure schematic diagram of a software module of a docking station terminal in the USB data communication device based on a hybrid USB Network according to an embodiment of the present application.

Optionally, the software module in the docking station terminal, as illustrated in FIG. 12, includes: a USB device management tree, a USB device manager, a terminal connector and a client terminal connecting manager.

Particularly, the software module in the docking station terminal includes: a USB device management tree with USB devices managing physical connection, a USB device manager for managing USB device information, an endpoint manager that determines a communication method and processes the actual data communication according to the type of the USB device, and a connecting manager for managing the actual communication connection to the client terminal.

A specific limitation related to the USB data communication device based on a hybrid USB Network can refer to the limitation of the USB data communication method based on a hybrid USB Network in the above, which will not be reiterated herein. The above individual modules in the USB data communication device based on a hybrid USB Network can be implemented in whole or in part by software, hardware and their combination. The above modules can be embedded in or independent of the processor in the computer device, or can be stored in the memory in the computer device in the form of software, so that the processor can call and execute the corresponding operations of the above individual modules.

Figure 13:
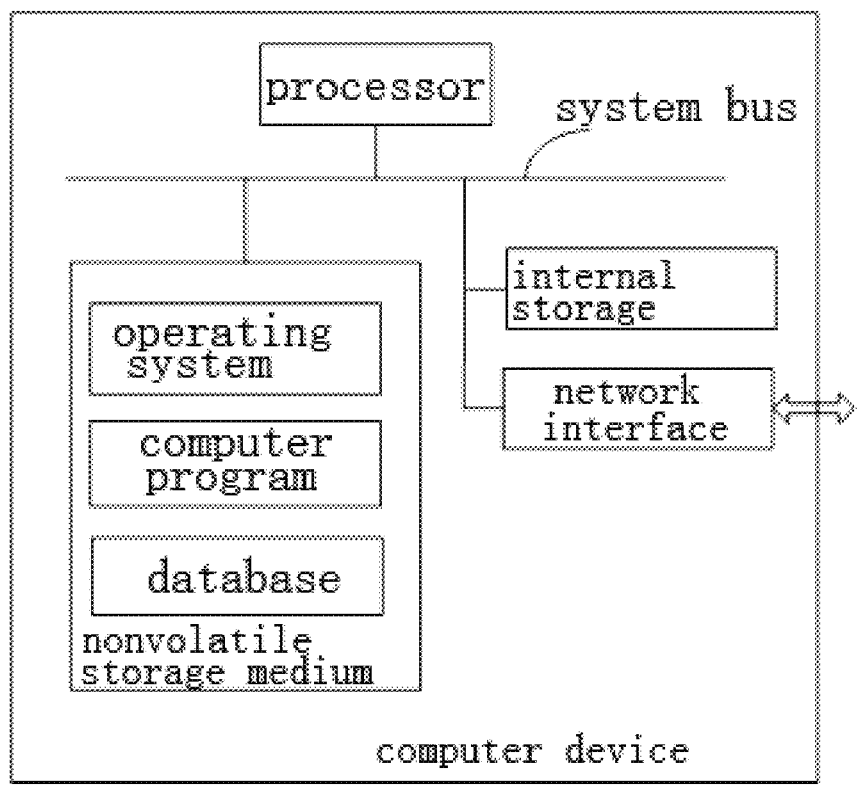
FIG. 13 illustrates a schematic diagram of a computer device according to an embodiment of the present application.

In an embodiment, a computer device is provided. The computer device can be the client terminal, in which the internal structure diagram can be illustrated as FIG. 13. The computer device includes a processor, a memory, a network interface and a data base that are connected via a bus of the device. In particular, the processor of the computer device is configured to provide calculation and control ability. The memory of the computer device includes a nonvolatile storage medium and an internal storage. The nonvolatile storage medium stores an operation device, a computer program, and a data base. The internal storage provides an environment for the operation of the operation device and the computer program in the nonvolatile storage medium.

The data base of the computer device is configured to store the data need to be stored in the USB data communication method based on a hybrid USB Network. The network interface of the computer device is configured to connect and communicate with external terminal via network. The computer program implements the USB data communication method based on a hybrid USB Network when is executed by the processor.

In an embodiment, a computer device is provided, which includes a memory, a processor, and a computer program stored in the memory and is able to run on the processor. The processor implements the USB data communication method based on a hybrid USB Network in the above embodiment when executes the computer program, such as step S11 to step S25 illustrated in FIG. 3. Alternatively, the processor implements the function of individual modules/units in the USB data communication device based on a hybrid USB Network in above embodiment when executes the computer program, such as the function of the docking station terminal finding request unit 11 to the USB communication data sending unit 25 illustrated in FIG. 10. To avoid repetition, it will not be reiterated herein.

It should be appreciated by those who are skilled in the art that the implement of the whole or part of the process in the method of above embodiment, can be completed by the instruction of the computer program to corresponding hardware. The computer program can be stored in a nonvolatile computer readable storage medium, which can include the process of above individual method embodiments. In particular, any reference to memory, storage, database or other media in each embodiment provided in present application, can include nonvolatile and/or volatile memory. Nonvolatile memory can include read-only memory (ROM), programmable ROM (PROM), electrically programmable ROM (EPROM), electrically-erasable programmable ROM (EEPROM) or flash. Volatile memory can include random access memory (RAM) or external cache. As a description but not limitation, RAM can be many forms, such as static RAM (SRAM), dynamic RAM (DRAM), synchronous DRAM (SDRAM), dual data rate SDRAM (DDRSDRAM), enhanced SDRAM (ESDRAM), synchronization link (Synchlink) DRAM (SLDRAM), memory bus (Rambus) direct RAM (RDRAM), direct memory bus dynamic RAM (DRDRAM) and memory bus dynamic RAM (RDRAM) etc..

Those who are skilled in the art can clearly understand that, for a convenient and brief description, only the division of the above function units and modules are in exemplary illustration. In practical applications, the above function can be distributed and completed by different function unit and module, which means that the internal structure of the device is divided into different function units or modules, to complete the whole or part of the function in above description.

The above embodiment is only used to illustrate the technical solution of present application, and not the limitation of it; although a detailed description referring to above embodiment is made for present application, those who are skilled in the art should understand that: the technical solution recorded in above individual embodiments can still be modified, or a part of the technical features herein can be in equivalent substitution; however, these modifications and substitutions do not make the essence of the corresponding technical solutions depart from the spirit and scope of the technical solutions in the embodiments of the present application, and should be included in the scope of protection of the present application.

What is claimed is:

1. A universal serial bus (USB) data communication method based on a hybrid USB Network, which is applied to a docking station terminal, comprising:
   obtaining a USB data monitoring command carrying an operation mode;
   when the operation mode is an automatic mode, monitoring a data communication status of a USB input and output interface;
   when the data communication status is a no input and output information status, monitoring data of a network input data interface of a network module in the docking station terminal;
   when the network input data interface obtains a data sending request sent by a client terminal via the hybrid USB Network, wherein the data sending request comprises network data and a target transmission device, converting the network data into USB communication data via a soft switching module in the docking station terminal; and
   sending, via a USB output data interface, the USB communication data to the target transmission device;
   wherein, after monitoring the data communication status of the USB input and output interface, the method further comprises:
      when the data communication status is a status of presence of input and output information, continuously monitoring data of the USB input and output interface.

2. The USB data communication method based on a hybrid USB Network according to claim 1, wherein, after obtaining the USB data monitoring command carrying the operation mode, the method further comprises:
   when the operation mode is a USB mode, continuously monitoring data of the USB input and output interface; and
   when the operation mode is a network mode, continuously monitoring the data of the network input data interface of the network module in the docking station terminal.

3. A universal serial bus (USB) data communication method based on a hybrid USB Network, which is applied to a client terminal, comprising:
   sending a docking station terminal finding request to the hybrid USB Network via a network module in the client terminal;
   when there is any docking station terminal on the hybrid USB Network, connecting to the docking station terminal to form a communication channel between the client terminal and the docking station terminal;
   sending a data sending request to the docking station terminal via the hybrid USB Network, wherein the data sending request comprises network data and a target transmission device; and
   when the communication channel is in a sharing mode, sending the network data to the target transmission device via the docking station terminal on the hybrid USB Network;
   wherein, after forming the communication channel between the client terminal and the docking station terminal, the method further comprises:
      when the communication channel is in a personal mode and the client terminal is not a first connection terminal, waiting for the docking station terminal to send a communicable command; and
      when receiving the communicable command sent by the docking station terminal, sending the network data to the target transmission device via the docking station terminal on the hybrid USB Network.

4. A universal serial bus (USB) data communication device based on a hybrid USB Network, comprising: a docking station terminal and a client terminal, wherein the docking station terminal comprises:

a monitoring command obtaining unit, configured to obtain a USB data monitoring command carrying an operation mode;

a communication status monitoring unit, configured to monitor a data communication status of a USB input and output interface when the operation mode is an automatic mode;

a data monitoring unit, configured to monitor data of a network input data interface of a network module in the docking station terminal when the data communication status is a no input and output information status;

a network data conversion unit, configured to, when the network input data interface obtains a data sending request sent by the client terminal via the hybrid USB Network, wherein the data sending request comprises network data and a target transmission device, convert the network data into USB communication data via a soft switching module in the docking station terminal; and a USB communication data sending unit, configured to send, via a USB output data interface, the USB communication data to the target transmission device; and wherein the client terminal comprises:

a docking station terminal finding request unit, configured to send a docking station terminal finding request to the hybrid USB Network via a network module in the client terminal;

a communication channel forming unit, configured to connect to the docking station terminal to form a communication channel between the client terminal and the docking station terminal, when there is any docking station terminal on the hybrid USB Network;

a data sending request sending unit, configured to send the data sending request to the docking station terminal via the hybrid USB Network; and a network data sending unit, configured to send the network data to the target transmission device via the docking station terminal on the hybrid USB Network when the communication channel is in a sharing mode;

wherein a software module in the docking station terminal comprises:

a USB device management tree, a USB device manager, a terminal connector, and a client terminal connecting manager.

5. The USB data communication device based on a hybrid USB Network according to the claim 4, wherein the network module in the client terminal comprises:

a USB network transfer protocol module, a connecting manager module, a device manager module and a virtual USB device manager module.

* * * * *